US010241569B2

(12) United States Patent
Lanman et al.

(10) Patent No.: US 10,241,569 B2
(45) Date of Patent: Mar. 26, 2019

(54) FOCUS ADJUSTMENT METHOD FOR A VIRTUAL REALITY HEADSET

(71) Applicant: Facebook Technologies, LLC, Menlo Park, CA (US)

(72) Inventors: Douglas Robert Lanman, Bellevue, WA (US); Ryan Michael Ebert, Kirkland, WA (US); Alexander Jobe Fix, Seattle, WA (US); William Aaron Nicholls, Seattle, WA (US); Michael Sean Mounier, Redmond, WA (US); Robert Dale Cavin, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 318 days.

(21) Appl. No.: 14/963,126

(22) Filed: Dec. 8, 2015

(65) Prior Publication Data
US 2017/0160798 A1 Jun. 8, 2017

(51) Int. Cl.
*G09G 5/00* (2006.01)
*G06F 3/01* (2006.01)
(Continued)

(52) U.S. Cl.
CPC ......... *G06F 3/013* (2013.01); *G02B 27/0093* (2013.01); *G02B 27/0172* (2013.01);
(Continued)

(58) Field of Classification Search
CPC ....... G06F 3/013; G02B 3/0081; G02B 15/14; G02B 26/0825; G06T 5/10; G06T 7/0075;
(Continued)

(56) References Cited

U.S. PATENT DOCUMENTS 5,768,443 A 6/1998 Michael et al.
5,801,885 A 9/1998 Togino
(Continued)

FOREIGN PATENT DOCUMENTS

JP 3298081 B2 7/2002
JP 2014-219621 * 10/2013
(Continued)

OTHER PUBLICATIONS

U.S. Appl. No. 14/963,109, filed Dec. 8, 2015, Inventors Douglas Robert Lanman et al.
(Continued)

*Primary Examiner* — Lun-Yi Lao
*Assistant Examiner* — Jarurat Suteerawongsa
(74) *Attorney, Agent, or Firm* — Fenwick & West LLP

(57) ABSTRACT

A virtual reality headset displays a three-dimensional (3D) virtual scene and includes a varifocal element to dynamically adjust a focal length of an optics block included in the virtual reality headset based on a location in the virtual scene where the user is looking. The headset tracks a user's eyes to approximate gaze lines and determines a plane of focus for a frame of the virtual scene as the intersection of the gaze lines. The varifocal element adjusts the focal length of the optics block so the optics block is focused at the plane of focus, which keeps the user's eyes in a zone of comfort as vergence and accommodation change. Based on the plane of focus, the virtual reality headset may provide depth cues, such as depth of field blur, to planes in the virtual scene deeper in the user's field of view than the plane of focus.

19 Claims, 8 Drawing Sheets

(51) Int. Cl.
- *G06T 5/00* (2006.01)
- *G02B 27/00* (2006.01)
- *G06F 3/0484* (2013.01)
- *G02B 27/01* (2006.01)

(52) U.S. Cl.
CPC .......... *G06F 3/04842* (2013.01); *G06T 5/002* (2013.01); *G02B 2027/0134* (2013.01); *G02B 2027/0138* (2013.01); *G02B 2027/0185* (2013.01)

(58) Field of Classification Search
CPC ......... G06T 7/60; G06T 15/00; G06T 19/006; G06T 2200/04; G06T 5/00; G06T 7/20; G06K 9/0061; G09G 2320/0693; G09G 5/00

See application file for complete search history.

(56) References Cited

U.S. PATENT DOCUMENTS

| | | |
|---|---|---|
| 5,892,570 A | 4/1999 | Stevens |
| 2001/0017687 A1 | 8/2001 | Rodriguez et al. |
| 2006/0210111 A1 | 9/2006 | Cleveland et al. |
| 2007/0183293 A1 | 8/2007 | Murata et al. |
| 2008/0062164 A1 | 3/2008 | Bassi et al. |
| 2009/0189974 A1 | 7/2009 | Deering |
| 2010/0079356 A1 | 4/2010 | Hoellwarth |
| 2010/0141852 A1* | 6/2010 | Jurik .................. G06T 5/006 348/745 |
| 2010/0177163 A1 | 7/2010 | Yang et al. |
| 2011/0075257 A1 | 3/2011 | Hua et al. |
| 2012/0218172 A1 | 8/2012 | Border et al. |
| 2012/0249797 A1 | 10/2012 | Haddick et al. |
| 2013/0050070 A1 | 2/2013 | Lewis et al. |
| 2013/0176533 A1 | 7/2013 | Raffle et al. |
| 2013/0314793 A1 | 11/2013 | Robbins et al. |
| 2014/0085452 A1 | 3/2014 | Nistico et al. |
| 2014/0092139 A1 | 4/2014 | Sullivan et al. |
| 2014/0153102 A1 | 6/2014 | Chang |
| 2014/0177063 A1 | 6/2014 | Wang et al. |
| 2014/0211193 A1 | 7/2014 | Bloom et al. |
| 2014/0368793 A1 | 12/2014 | Friedman et al. |
| 2015/0035744 A1 | 2/2015 | Robbins et al. |
| 2015/0062558 A1 | 3/2015 | Koppal et al. |
| 2015/0102981 A1 | 4/2015 | Lee et al. |
| 2015/0181096 A1 | 6/2015 | Kasai et al. |
| 2015/0212326 A1 | 7/2015 | Kress et al. |
| 2015/0222883 A1 | 8/2015 | Welch |
| 2015/0237336 A1 | 8/2015 | Sylvan et al. |
| 2015/0286070 A1 | 10/2015 | Aikawa |
| 2015/0288944 A1 | 10/2015 | Nistico et al. |
| 2015/0312560 A1 | 10/2015 | Deering et al. |
| 2015/0346495 A1 | 12/2015 | Welch et al. |
| 2016/0005179 A1 | 1/2016 | Petyushko et al. |
| 2016/0091720 A1 | 3/2016 | Stafford et al. |
| 2016/0103419 A1 | 4/2016 | Callagy et al. |
| 2016/0219269 A1 | 7/2016 | Tekolste |
| 2016/0240013 A1 | 8/2016 | Spitzer |
| 2016/0295178 A1 | 10/2016 | Damberg et al. |
| 2016/0371886 A1 | 12/2016 | Thompson et al. |
| 2017/0031435 A1 | 2/2017 | Raffle et al. |
| 2017/0161951 A1 | 6/2017 | Fix et al. |
| 2017/0213388 A1 | 7/2017 | Margolis et al. |
| 2017/0343822 A1 | 11/2017 | Border et al. |
| 2018/0133593 A1 | 5/2018 | Wilson |

FOREIGN PATENT DOCUMENTS

| | | |
|---|---|---|
| JP | 2014-219621 A | 11/2014 |
| KR | 10-2013-0011692 A | 1/2013 |
| KR | 10-2014-0144510 A | 12/2014 |
| WO | WO 2015/184412 A1 | 12/2015 |

OTHER PUBLICATIONS

U.S. Appl. No. 15/407,701, filed Jan. 17, 2017, Inventors Nicholas Daniel Trail et al.
U.S. Appl. No. 15/366,412, filed Dec. 1, 2016, Inventor Nicholas Daniel Trail.
Machine translated JP2014-219521; Date of publication: Nov. 20, 2014.
PCT International Search Report and Written Opinion, PCT Application No. PCT/US2017/012346, dated Mar. 30, 2017, 13 pages.
PCT International Search Report and Written Opinion, PCT Application No. PCT/US2016/059938, dated Dec. 20, 2016, 12 pages.
PCT International Search Report and Written Opinion, PCT Application No. PCT/US2016/017397, dated Aug. 16, 2016, 21 pages.
European Extended Search Report, European Application No. 16161315.3, Aug. 2, 2016, 10 pages.
Robinett, W., "Computational Model for the Stereoscopic Optics of a Head-Mounted Display," Proceedings of SPIE Stereoscopic Displays and Applications II, Jan. 1991, pp. 140-160, vol. 1457.
State, A. et al., "Dynamic Virtual Convergence for Video See-Through Head-Mounted Displays: Maintaining Maximum Stereo Overlap Throughout a Close-Range Work Space," IEEE and ACM International Symposium on New Augmented Reality, Oct. 29-30, 2001, pp. 137-146.

* cited by examiner (Real World)

(3D Display)

(Frame n)

(Frame n+1)

(Frame n)

(Frame n+1)

FOCUS ADJUSTMENT METHOD FOR A VIRTUAL REALITY HEADSET

BACKGROUND

The present disclosure generally relates to enhancing images from electronic displays, and specifically to varying the focal length of optics to enhance the images.

Virtual reality (VR) headset can be used to simulate virtual environments. For example, stereoscopic images can be displayed on an electronic display inside the headset to simulate the illusion of depth and head tracking sensors can be used to estimate what portion of the virtual environment is being viewed by the user. Such a simulation, however, can cause visual fatigue and nausea resulting from an inability of existing headsets to correctly render or otherwise compensate for vergence and accommodation conflicts.

SUMMARY

A virtual reality headset automatically adjusts its focus based on a location within a virtual scene presented by the virtual reality headset that the user views. A three-dimensional (3D) virtual scene is presented on an electronic display element (e.g., a screen) of the virtual reality headset and a focal length of an optics block that directs image light from the electronic display element towards eyes of the user is adjusted using a varifocal element (e.g., an element that mechanically changes a distance between a lens system in the optics block and the electronic display element, an element that changes shape of one or more lenses in the lens system in the optics block, etc.) based on a location or object within the virtual scene where the user is looking. For example, the virtual reality headset tracks a user's eyes to approximate gaze lines and determines a gaze point including a vergence depth as an estimated point of intersection of the gaze lines. The gaze point identifying an object or plane of focus for a particular frame of the virtual scene presented to the user by the virtual reality headset.

The gaze lines often do not intersect and are an approximation based on the location or position of the user's eyes, the vergence depth of the gaze point estimated from the gaze lines may be further refined or filtered using geometric data for the virtual scene presented by the virtual reality headset. Based on the positions of the user's head and eyes, the virtual reality headset identifies a location or an object within the virtual scene presented by the virtual headset where the user is looking. Based on the location or the object within the virtual scene where the user is looking and geometric data for the virtual scene (i.e., virtual distances between objects in the virtual scene), the virtual reality headset corrects the estimated vergence depth and gaze point.

In various embodiments, the varifocal element adjusts the focal length of the optics block to focus the optics block at the corrected estimated vergence depth for the gaze point to keep the user's eyes in a zone of comfort as vergence and accommodation change. Further, given the object or plane of focus at the corrected estimated vergence depth, the virtual reality headset may dynamically add depth of field blur based on the object or the plane of focus when rendering the virtual scene to provide a depth cue.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
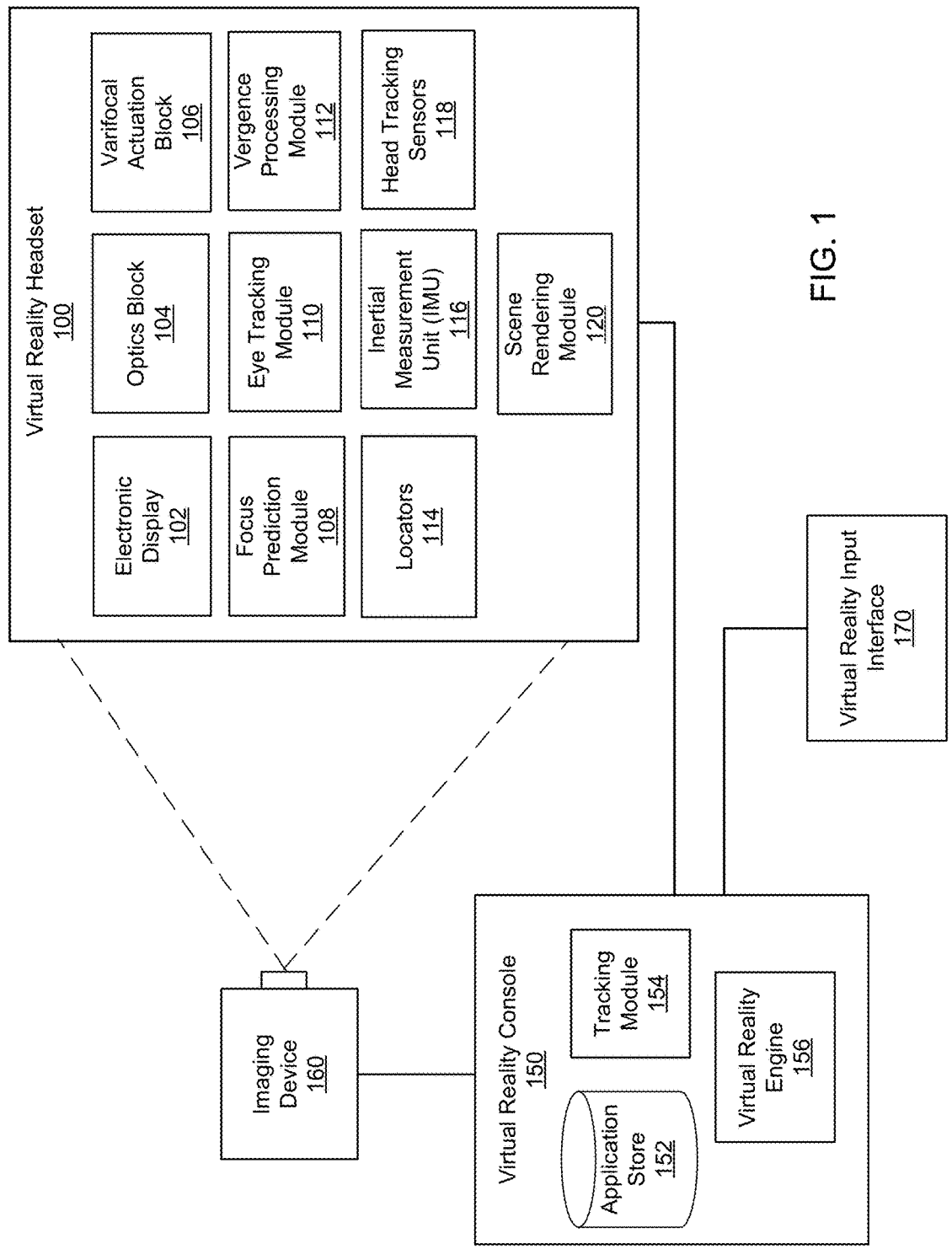
FIG. 1 shows an example virtual reality system, in accordance with at least one embodiment.

FIG. 1 is virtual reality (VR) system environment in which a VR console 150 operates. In this example, the VR system environment includes VR headset 100, imaging device 160, and VR input interface 170, which are each coupled to VR console 150. While FIG. 1 shows a single VR headset 100, a single imaging device 160, and a single VR input interface 170, in other embodiments, any number of these components may be included in the system. For example, there may be multiple VR headsets 100 each having an associated VR input interface 170 and being monitored by one or more imaging devices 160, with each VR headset 100, VR input interface 170, and imaging devices 160 communicating with the VR console 150. In alternative configurations, different and/or additional components may also be included in the VR system environment.

VR headset 100 is a Head-Mounted Display (HMD) that presents content to a user. Example content includes images, video, audio, or some combination thereof. Audio content may be presented via a separate device (e.g., speakers and/or headphones) external to VR headset 100 that receives audio information from VR headset 100, VR console 150, or both. VR headset 100 includes electronic display 102, optics block 104, varifocal actuation block 106, focus prediction module 108, eye tracking module 110, vergence processing module 112, one or more locators 114, internal measurement unit (IMU) 116, head tracking sensors 118, and scene rendering module 120.

Optics block 104 directs light from electronic display 102 to an exit pupil for viewing by a user using one or more optical elements, such as apertures, Fresnel lenses, convex lenses, concave lenses, filters, and so forth, and may include combinations of different optical elements. In some embodiments, one or more optical elements in optics block 104 may have one or more coatings, such as anti-reflective coatings. Magnification of the image light by optics block 104 allows electronic display 102 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

Optics block 104 may be designed to correct one or more optical errors. Examples of optical errors include: barrel distortion, pincushion distortion, longitudinal chromatic aberration, transverse chromatic aberration, spherical aberration, comatic aberration, field curvature, astigmatism, and so forth. In some embodiments, content provided to electronic display 102 for display is pre-distorted, and optics block 104 corrects the distortion when it receives image light from electronic display 102 generated based on the content.

Varifocal actuation block 106 includes a varifocal element that causes optics block 104 to vary the focal length (or optical power) of VR headset 100 keep a user's eyes in a zone of comfort as vergence and accommodation change. In one embodiment, varifocal actuation block 106 physically changes the distance between electronic display 102 and optical block 104 by moving electronic display 102 or optical block 104 (or both). Alternatively, varifocal actuation block 106 changes the focal length of optics block 104 by adjusting one or more properties of one or more lenses. Example properties of a lens adjusted by the varifocal actuation block include: an optical path length, an index of refraction of a lens medium, a shape of a lens, and so forth. For example, varifocal actuation block 106 changes the focal length of the one or more lenses using shape-changing polymer lenses, electrowetting methods with liquid lenses, Alvarez-Lohmann lenses, deformable membrane mirrors, liquid crystal (electroactive) lenses, or phase-only spatial light modulators (SLMs), or any other suitable component. Additionally, moving or translating two lenses relative to each other may also be used to change the focal length of VR headset 100. Thus, varifocal actuation block 106 may include actuators or motors that move electronic display 102 and/or optical block 104 on a track to change the distance between them or may include actuators and other components or mechanisms for changing the properties of one or more lenses included in optics block 104. Varifocal actuation block 106 may be separate from or integrated into optics block 104 in various embodiments.

Each state of optics block 104 corresponds to a focal length of VR headset 110 or to a combination of the focal length and eye position relative to optics block 104 (as discussed further below). In operation, optics block 104 may move in a range of ~5 mm with a positional accuracy of ~5 µm for a granularity of around 1000 focal lengths, corresponding to 1000 states of optics block 104. Any number of states could be provided; however, a limited number of states accommodate the sensitivity of the human eye, allowing some embodiments to include fewer focal lengths. For example, a first state corresponds to a focal length of a theoretical infinity meters (0 diopter), a second state corresponds to a focal length of 2.0 meters (0.5 diopter), a third state corresponds to a focal length of 1.0 meters (1 diopter), a fourth state corresponds to a focal length of 0.5 meters (1 diopter), a fifth state corresponds to a focal length of 0.333 meters (3 diopter), and a sixth state corresponds to a focal length of 0.250 meters (4 diopter). Varifocal actuation block 106, thus, sets and changes the state of optics block 104 to achieve a desired focal length.

Focus prediction module 108 is an encoder including logic that tracks the state of optics block 104 to predict to one or more future states or locations of optics block 104. For example, focus prediction module 108 accumulates historical information corresponding to previous states of optics block 104 and predicts a future state of optics block 104 based on the previous states. Because rendering of a virtual scene by VR headset 100 is adjusted based on the state of optics block 104, the predicted state allows scene rendering module 120, further described below, to determine an adjustment to apply to the virtual scene for a particular frame. Accordingly, focus prediction module 108 communicates information describing a predicted state of optics block 104 for a frame to scene rendering module 120. Adjustments for the different states of optics block 104 performed by scene rendering module 120 are further described below.

Eye tracking module 110 tracks an eye position and eye movement of a user of VR headset 100. A camera or other optical sensor inside VR headset 100 captures image information of a user's eyes, and eye tracking module 110 uses the captured information to determine interpupillary distance, interocular distance, a three-dimensional (3D) position of each eye relative to VR headset 100 (e.g., for distortion adjustment purposes), including a magnitude of torsion and rotation (i.e., roll, pitch, and yaw) and gaze directions for each eye. In one example, infrared light is emitted within VR headset 100 and reflected from each eye. The reflected light is received or detected by the camera and analyzed to extract eye rotation from changes in the infrared light reflected by each eye. Many methods for tracking the eyes of a user can be used by eye tracking module 110. Accordingly, eye tracking module 110 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, eye tracking module 110 integrates information from past measurements, measurements identifying a position of a user's head, and 3D information describing a scene presented by electronic display element 102. Thus, information for the position and orientation of the user's eyes is used to determine the gaze point in a virtual scene presented by VR headset 100 where the user is looking.

Further, distance between a pupil and optics block 104 changes as the eye moves to look in different directions. The varying distance between pupil and optics block 104 as viewing direction changes is referred to as "pupil swim" and contributes to distortion perceived by the user as a result of light focusing in different locations as the distance between pupil and optics block 104. Accordingly, measuring distortion a different eye positions and pupil distances relative to optics block 104 and generating distortion corrections for different positions and distances allows mitigation of distortion caused by "pupil swim" by tracking the 3D position of a user's eyes and applying a distortion correction corresponding to the 3D position of each of the user's eye at a given point in time. Thus, knowing the 3D position of each of a user's eyes allows for the mitigation of distortion caused by changes in the distance between the pupil of the eye and optics block 104 by applying a distortion correction for each 3D eye position.

Vergence processing module 112 determines a vergence depth of a user's gaze based on the gaze point or an estimated intersection of the gaze lines determined by eye tracking module 110. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, vergence processing module 112 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused and a depth from the user's eyes at which the eyes are focused, thereby, providing information, such as an object or plane of focus, for rendering adjustments to the virtual scene.

In some embodiments, rather than provide accommodation for the eye at a determined vergence depth, accommodation may be directly determined by a wavefront sensor, such as a Shack-Hartmann wavefront sensor; hence, a state of optics block 104 may be a function of the vergence or accommodation depth and the 3D position of each eye, so optics block 104 brings objects in a scene presented by electronic display element 102 into focus for a user viewing the scene. Further, vergence and accommodation information may be combined to focus optics block 104 and to render synthetic depth of field blur.

Locators 114 are objects located in specific positions on VR headset 100 relative to one another and relative to a specific reference point on VR headset 100. Locator 114 may be a light emitting diode (LED), a corner cube reflector, a reflective marker, a type of light source that contrasts with an environment in which VR headset 100 operates, or some combination thereof. Active locators 114 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 114 can be located beneath an outer surface of VR headset 100, which is transparent to the wavelengths of light emitted or reflected by locators 114 or is thin enough not to substantially attenuate the wavelengths of light emitted or reflected by locators 114. Further, the outer surface or other portions of VR headset 100 can be opaque in the visible band of wavelengths of light. Thus, locators 114 may emit light in the IR band while under an outer surface of VR headset 100 that is transparent in the IR band but opaque in the visible band.

IMU 116 is an electronic device that generates fast calibration data based on measurement signals received from one or more of head tracking sensors 118, which generate one or more measurement signals in response to motion of VR headset 100. Examples of head tracking sensors 118 include accelerometers, gyroscopes, magnetometers, other sensors suitable for detecting motion, correcting error associated with IMU 116, or some combination thereof. Head tracking sensors 118 may be located external to IMU 116, internal to IMU 116, or some combination thereof.

Based on the measurement signals from head tracking sensors 118, IMU 116 generates fast calibration data indicating an estimated position of VR headset 100 relative to an initial position of VR headset 100. For example, head tracking sensors 118 include multiple accelerometers to measure translational motion (forward/back, up/down, left/right) and multiple gyroscopes to measure rotational motion (e.g., pitch, yaw, and roll). IMU 116 can, for example, rapidly sample the measurement signals and calculate the estimated position of VR headset 100 from the sampled data. For example, IMU 116 integrates measurement signals received from the accelerometers over time to estimate a velocity vector and integrates the velocity vector over time to determine an estimated position of a reference point on VR headset 100. The reference point is a point that may be used to describe the position of VR headset 100. While the reference point may generally be defined as a point in space, in various embodiments, reference point is defined as a point within VR headset 100 (e.g., a center of the IMU 130). Alternatively, IMU 116 provides the sampled measurement signals to VR console 150, which determines the fast calibration data.

IMU 116 can additionally receive one or more calibration parameters from VR console 150. As further discussed below, the one or more calibration parameters are used to maintain tracking of VR headset 100. Based on a received calibration parameter, IMU 116 may adjust one or more IMU parameters (e.g., sample rate). In some embodiments, certain calibration parameters cause IMU 116 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Scene render module 120 receives content for the virtual scene from VR engine 156 and provides the content for display on electronic display 102. Additionally, scene render module 120 can adjust the content based on information from focus prediction module 108, vergence processing module 112, IMU 116, and head tracking sensors 118. For example, upon receiving the content from VR engine 156, scene render module 120 adjusts the content based on the predicted state (i.e., eye position and focal length) of optics block 104 received from focus prediction module 108 by adding a correction or pre-distortion into rendering of the virtual scene to compensate or correct for the distortion caused by the predicted state of optics block 104. Scene render module 120 may also add depth of field blur based on the user's gaze, vergence depth (or accommodation depth) received from vergence processing module 112, or measured properties of the user's eye (e.g., 3D position of the eye, etc.). Additionally, scene render module 120 determines a portion of the content to be displayed on electronic display 102 based on one or more of tracking module 154, head tracking sensors 118, or IMU 116, as described further below.

Imaging device 160 generates slow calibration data in accordance with calibration parameters received from VR console 150. Slow calibration data includes one or more images showing observed positions of locators 114 that are detectable by imaging device 160. Imaging device 160 may include one or more cameras, one or more video cameras, other devices capable of capturing images including one or more locators 114, or some combination thereof. Additionally, imaging device 160 may include one or more filters (e.g., for increasing signal to noise ratio). Imaging device 160 is configured to detect light emitted or reflected from locators 114 in a field of view of imaging device 160. In embodiments where locators 114 include passive elements (e.g., a retroreflector), imaging device 160 may include a light source that illuminates some or all of locators 114, which retro-reflect the light towards the light source in imaging device 160. Slow calibration data is communicated from imaging device 160 to VR console 150, and imaging device 160 receives one or more calibration parameters from VR console 150 to adjust one or more imaging parameters (e.g., focal length, focus, frame rate, ISO, sensor temperature, shutter speed, aperture, etc.).

VR input interface 170 is a device that allows a user to send action requests to VR console 150. An action request is a request to perform a particular action. For example, an action request may be to start or end an application or to perform a particular action within the application. VR input interface 170 may include one or more input devices. Example input devices include a keyboard, a mouse, a game controller, or any other suitable device for receiving action requests and communicating the received action requests to VR console 150. An action request received by VR input interface 170 is communicated to VR console 150, which performs an action corresponding to the action request. In some embodiments, VR input interface 170 may provide haptic feedback to the user in accordance with instructions received from VR console 150. For example, haptic feedback is provided by the VR input interface 170 when an action request is received, or VR console 150 communicates instructions to VR input interface 170 causing VR input interface 170 to generate haptic feedback when VR console 150 performs an action.

VR console 150 provides content to VR headset 100 for presentation to the user in accordance with information received from imaging device 160, VR headset 100, or VR input interface 170. In the example shown in FIG. 1, VR console 150 includes application store 152, tracking module 154, and virtual reality (VR) engine 156. Some embodiments of VR console 150 have different or additional modules than those described in conjunction with FIG. 1. Similarly, the functions further described below may be distributed among components of VR console 150 in a different manner than is described here.

Application store 152 stores one or more applications for execution by VR console 150. An application is a group of instructions, that when executed by a processor, generates content for presentation to the user. Content generated by an application may be in response to inputs received from the user via movement of VR headset 100 or VR interface device 170. Examples of applications include gaming applications, conferencing applications, video playback application, or other suitable applications.

Tracking module 154 calibrates the VR system using one or more calibration parameters and may adjust one or more calibration parameters to reduce error in determining position of VR headset 100. For example, tracking module 154 adjusts the focus of imaging device 160 to obtain a more accurate position for observed locators 114 on VR headset 100. Moreover, calibration performed by tracking module 154 also accounts for information received from IMU 116. Additionally, if tracking of VR headset 100 is lost (e.g., imaging device 160 loses line of sight of at least a threshold number of locators 114), tracking module 154 re-calibrates some or all of the VR system components.

Additionally, tracking module 154 tracks the movement of VR headset 100 using slow calibration information from imaging device 160 and determines positions of a reference point on VR headset 100 using observed locators from the slow calibration information and a model of VR headset 100. Tracking module 154 also determines positions of the reference point on VR headset 100 using position information from the fast calibration information from IMU 116 on VR headset 100. Additionally, tracking module 154 may use portions of the fast calibration information, the slow calibration information, or some combination thereof, to predict a future location of VR headset 100, which is provided to VR engine 156.

VR engine 156 executes applications within the VR system and receives position information, acceleration information, velocity information, predicted future positions, or some combination thereof for VR headset 100 from tracking module 154. Based on the received information, VR engine 156 determines content to provide to VR headset 100 for presentation to the user, such as a virtual scene. For example, if the received information indicates that the user has looked to the left, VR engine 156 generates content for VR headset 100 that mirrors or tracks the user's movement in a virtual environment. Additionally, VR engine 156 performs an action within an application executing on VR console 150 in response to an action request received from the VR input interface 170 and provides feedback to the user that the action was performed. The provided feedback may be visual or audible feedback via VR headset 100 or haptic feedback via VR input interface 170.

Figure 2:
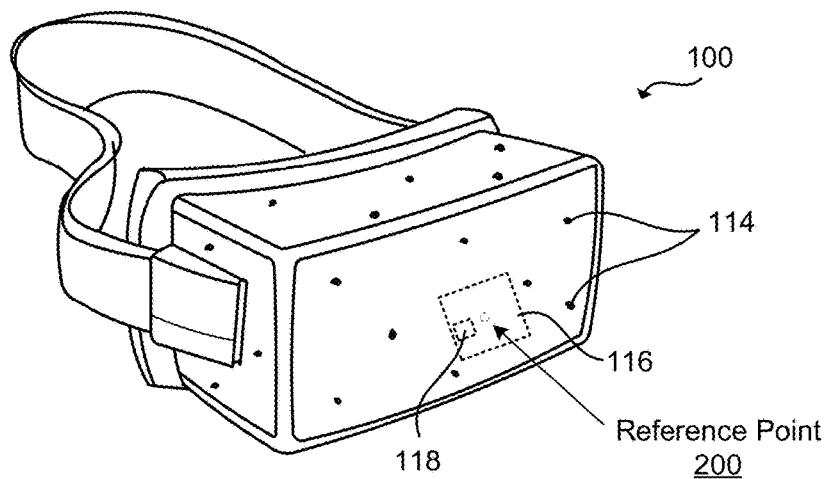
FIG. 2 shows a diagram of a virtual reality headset, in accordance with at least one embodiment.

FIG. 2 is a diagram of VR headset 100, in accordance with at least one embodiment. In this example, VR headset 100 includes a front rigid body and a band that goes around a user's head. The front rigid body includes one or more electronic display elements corresponding to electronic display 102, IMU 116, head tracking sensors 118, and locators 114. In this example, head tracking sensors 118 are located within IMU 116.

Figure 3:
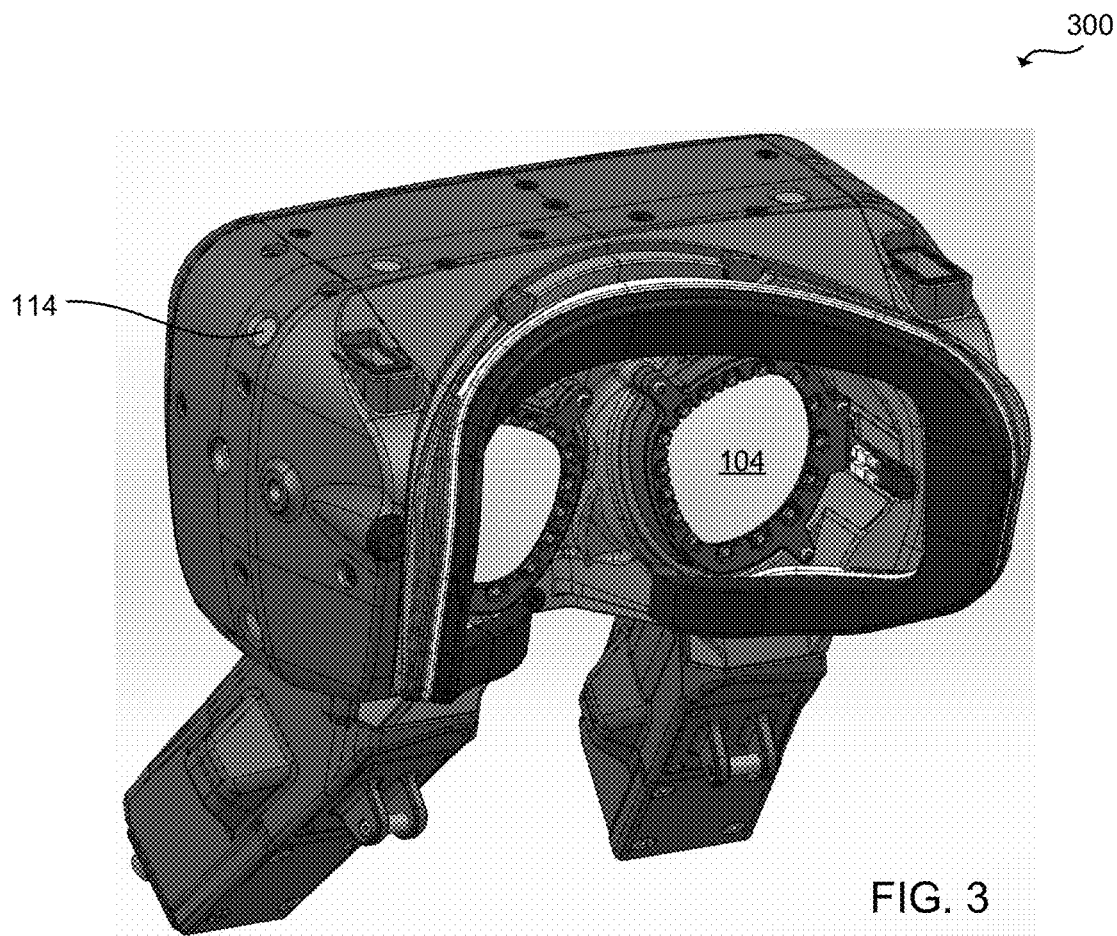
FIG. 3 shows a virtual reality headset, in accordance with at least one embodiment.

Locators 114 are located in fixed positions on the front rigid body relative to one another and relative to reference point 200. In this example, reference point 200 is located at the center of IMU 116. Each of locators 114 emits light that is detectable by imaging device 160. Locators 114, or portions of locators 114, are located on a front side, a top side, a bottom side, a right side, and a left side of the front rigid body, as shown FIG. 2. FIG. 3 shows a rear perspective view looking into VR headset 300 where an outer lens of optics block 104 is visible. In this example, locators 114 are visible and provided, as discussed above, on the surface of VR headset 300 for detection by imaging device 160.

Focus Adjustment Method

Figure 4:
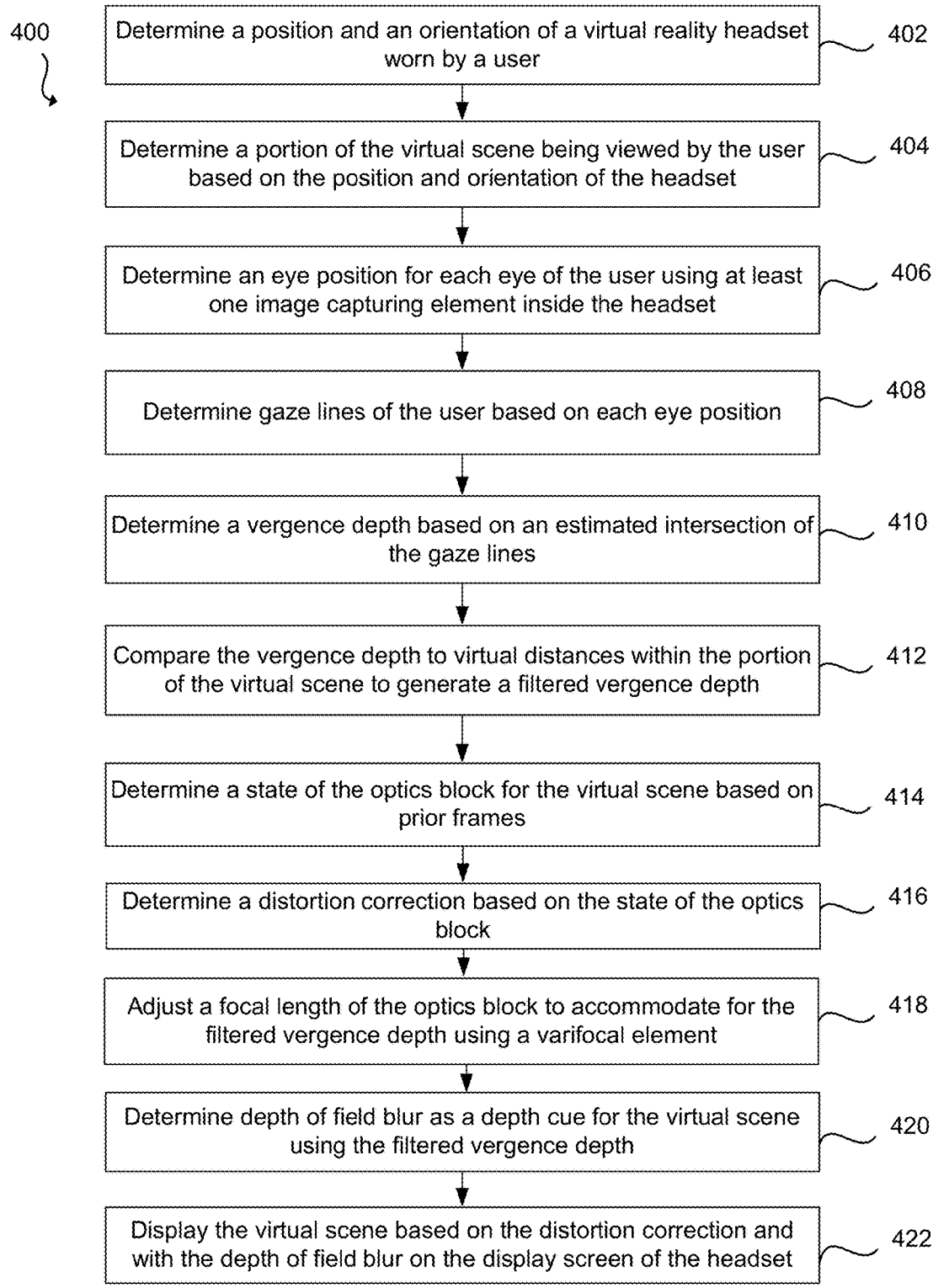
FIG. 4 shows an example process for mitigating vergence-accommodation conflict by adjusting the focal length of an optics block of a virtual reality headset, in accordance with at least one embodiment.

FIG. 4 shows an embodiment of a process 400 for mitigating vergence-accommodation conflict by adjusting the focal length of optics block 104 of virtual reality (VR) headset 100. As discussed above, a varifocal system may dynamically vary its focus to bring images presented to a user wearing VR headset 100 into focus, which keeps the user's eyes in a zone of comfort as vergence and accommodation change. Additionally, eye tracking in combination with the variable focus of the varifocal system allows blurring to be introduced as depth cues in images presented by VR headset 100.

Accordingly, in the embodiment shown by FIG. 4, a position, an orientation, and/or a movement of VR headset 100 are determined 402 by a combination of locators 114, IMU 116, head tracking sensors 118, imagining device 160, and tracking module 154, as described above in conjunction with FIG. 1. Portions of a virtual scene presented by VR headset 100 are mapped to various positions and orientations of VR headset 100. Thus, a portion of the virtual scene currently viewed by a user is determined 404 based on the position, orientation, and movement of VR headset 100. After determining 404 the portion of the virtual scene being viewed by the user, the VR system may then determine a location or an object within the determined portion at which the user is looking to adjust focus for that location or object accordingly.

Figure 5:
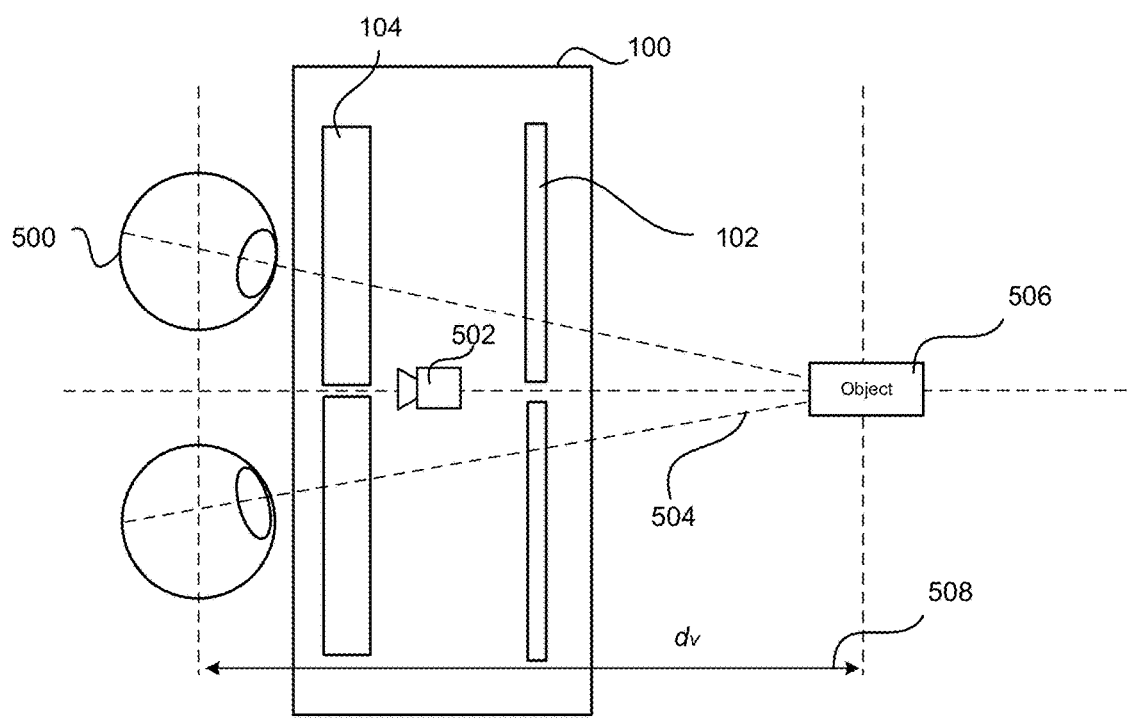
FIG. 5 shows a cross section of a virtual reality headset including a camera for tracking eye position, in accordance with at least one embodiment.

To determine the location or object within the determined portion of the virtual scene at which the user is looking, VR headset 100 tracks the position and location of the user's eyes. Thus, VR headset 100 determines 406 an eye position for each eye of the user. For example, VR headset 100 tracks at least a subset of the 3D position, roll, pitch, and yaw of each eye and uses these quantities to estimate a 3D gaze point of each eye. Further, information from past eye positions, information describing a position of the user's head, and information describing a scene presented to the user may also be used to estimate the 3D gaze point of an eye in various embodiments. For example, FIG. 5 shows a cross section of an embodiment of VR headset 100 that includes camera 502 for tracking the position of each eye 500. In this example, camera 502 captures images of the user's eyes and eye tracking module 110 determines an output for each eye 500 and gaze lines 504 corresponding to the gaze point or location where the user is looking based on the captured images.

Referring to FIGS. 4 and 5, vergence depth ($d_v$) 508 of the gaze point for the user is determined 410 based on an estimated intersection of gaze lines 504. As shown in FIG. 5, gaze lines 504 converge or intersect at $d_v$ 508, where object 506 is located. Because virtual distances within the virtual scene are known to the VR system, the vergence depth 508 can be filtered or verified to determine a more accurate vergence depth for the virtual scene. For example, vergence depth 508 is an approximation of the intersection of gaze lines 504, which are themselves an approximation based on the position of a user's eyes 500. Gaze lines 504 do not always appear to accurately intersect. Thus, virtual distances within the virtual scene are compared 412 to the vergence depth for the portion of the virtual scene to generate a filtered vergence depth.

Figure 6:
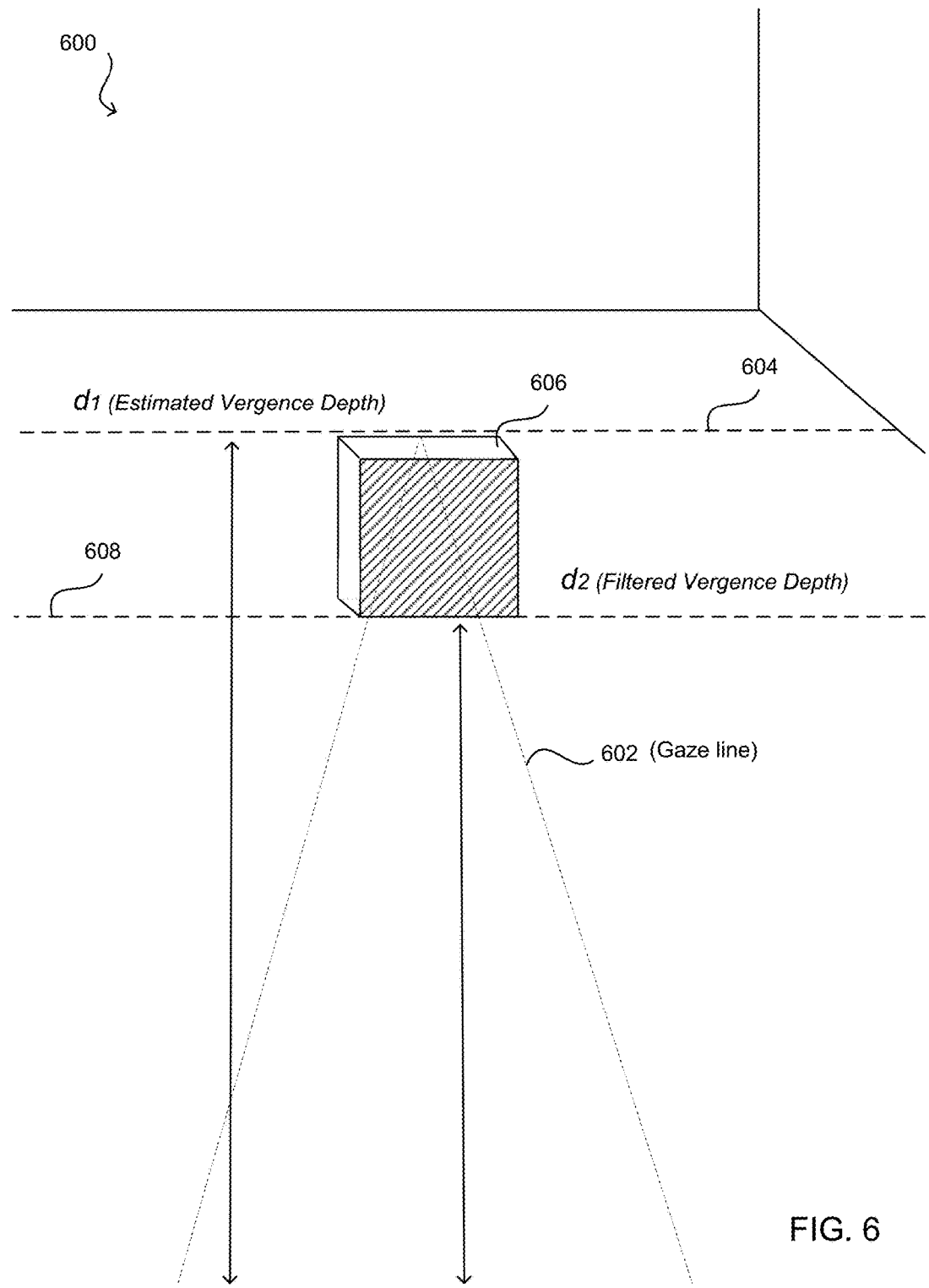
FIG. 6 shows an example process for filtering a vergence depth based on scene geometry, in accordance with at least one embodiment.

FIG. 6 shows an example process for filtering a vergence depth or gaze point location based on scene geometry. In the example of FIG. 6, object 606 is shown on a floor of virtual scene 600 and is the only object in virtual scene 600. Additionally, the geometry for virtual scene 600 is known. For example, to provide a virtual environment enabling a user to interact with that environment as if the user were actually in the virtual environment, the dimensions of the environment corresponding to its geometry are accurately known to VR system. Thus, for a particular frame of virtual scene 600, the distance between the user and the wall, the user and object 606, and object 606 and the wall are known values. These known values allow the accuracy of the determined vergence depth.

In the example of FIG. 6, gaze lines 602 are initially verged at vergence depth $d_1$ (line 604), which corresponds to the estimated vergence depth determined by vergence processing module 112. Vergence processing module 112 receives data for virtual scene 600 that including scene geometry data describing distances between objects in virtual scene 600 from scene render module 120 to verify the accuracy of the estimated vergence depth. The scene geometry data, in this example, indicates that virtual scene 600 includes object 606 at distance $d_2$ (line 608) from the user. Vergence processing module 112 compares distance $d_1$ to $d_2$ to determine if they are equal. In the example of FIG. 6, the distances $d_1$ and $d_2$ are unequal, but the difference is less than a threshold distance, indicating the estimated vergence depth ($d_1$) was slightly inaccurate and that the vergence depth is more accurately $d_2$. Because, vergence processing module 112 obtains information indicating there are no other objects in virtual scene 600, vergence processing module 112 and filters or adjusts the estimated vergence depth $d_1$ to filtered vergence depth $d_2$.

Determining a more accurate vergence depth or gaze point enables the virtual scene to more accurately determine a user's object or plane of focus, allowing scene rendering module 120 to add depth of field blur to proper depths and/or objects in the virtual scene or otherwise modify to virtual scene to appear more realistic. Further, if virtual scene 600 in FIG. 6 included multiple objects, the vergence processing module 112 compares the estimated vergence depth to distances associated with at least a subset of the objects. In one example, the minimum difference between distance to an object and the estimated vergence depth is determined to be the filtered vergence depth; however, other methods of identifying an object that specifies the filtered vergence depth may be used in various embodiments.

Returning to FIG. 4, a state of optics block 104 is determined 414 for a frame of the virtual scene based on states of optics block 140 during presentation of previous frames of the virtual scene. For example, focus prediction module 108 tracks the state of optics block 104 for various frames of the virtual scene to predict to future a state of optics block 104 for subsequent frames of the virtual scene. The predicted state of optics block 104 (e.g., a predicted location of optics block 104) allows the scene rendering module 114 to determine an adjustment to apply to a frame of the virtual scene so distortion caused by the predicted state of optics block 104 corrects or cancels the applied adjustment rather than distorting the frame. Thus, based on the state of optics block 104, a distortion correction is determined 416 for application to a frame of the virtual scene to correct optical error introduced by the state of optics block 104.

Figure 7A:
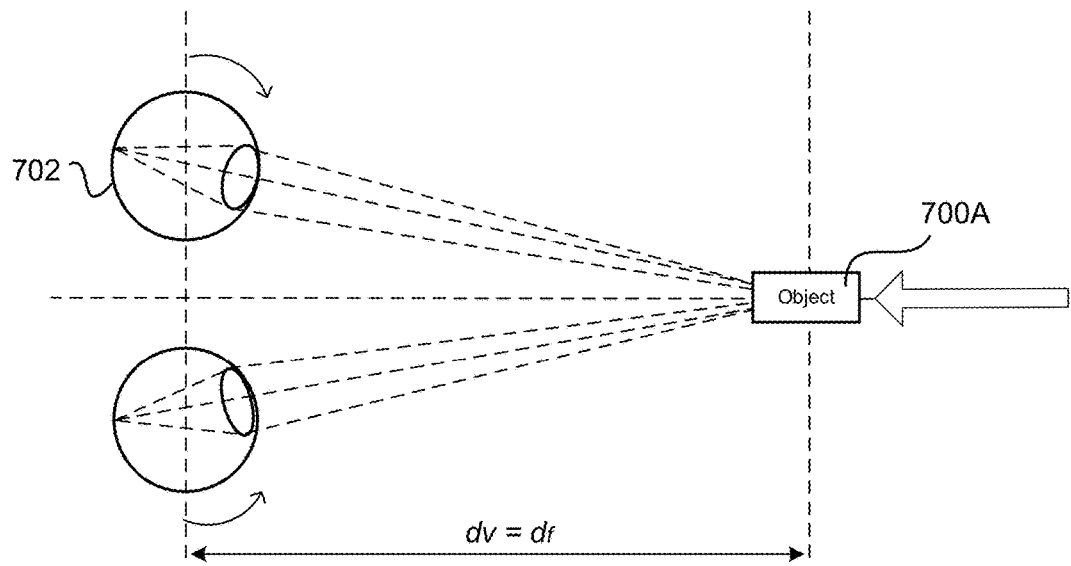
FIG. 7A shows the relationship between vergence and eye focal length in the real world.

FIG. 7A shows an example of how the human eye experiences vergence and accommodation in the real world. Vergence is the simultaneous movement or rotation of both eyes in opposite directions to obtain or maintain single binocular vision and is connected to accommodation of the eye. Under normal conditions, changing the focus of the eyes to look at an object at a different distance automatically causes vergence and accommodation. In the example of FIG. 7A, the user is looking at real object 700A (i.e., the user's eyes are verged on real object 700A and gaze lines from the user's eyes intersect at real object 700A.). As real object 700A is moved closer to the user, as indicated by the arrow in FIG. 7A, each eye 702 rotates inward to stay verged on real object 700A. As real object 700A gets closer, eye 702 must "accommodate" for the closer distance by reducing the power or focal length of eye 702 by changing its shape. Thus, under normal conditions in the real world, the vergence depth ($d_v$) equals the focal length ($d_f$).

Figure 7B:
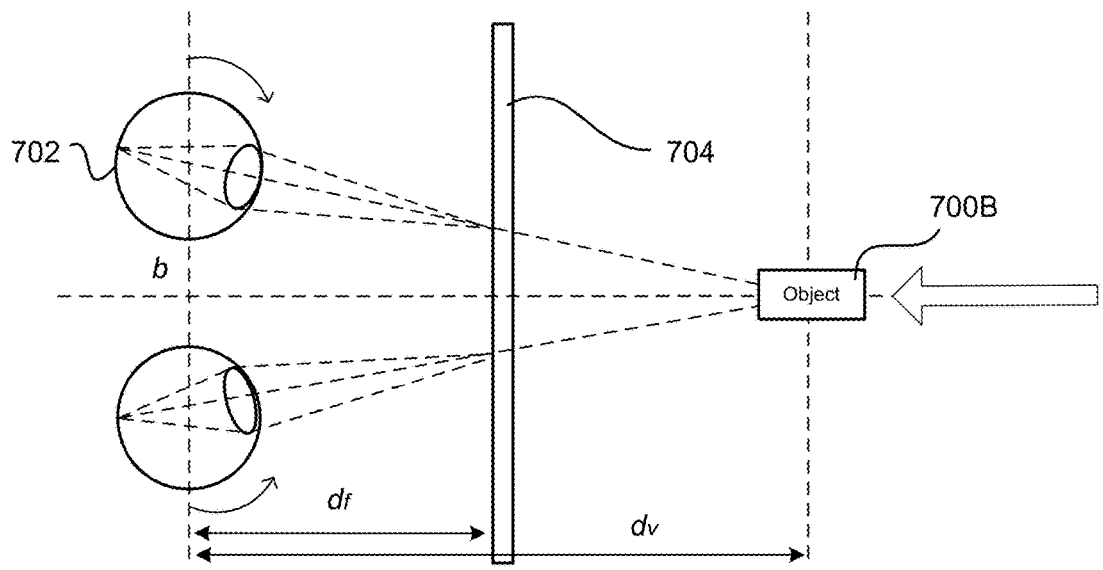
FIG. 7B shows the conflict between vergence and eye focal length in a three-dimensional display.

However, FIG. 7B shows an example conflict between vergence and accommodation that can occur with some three-dimensional displays. In this example, a user is looking at virtual object 700B displayed on 3D electronic screen 704; however, the user's eyes are verged on and gaze lines from the user's eyes intersect at virtual object 700B, which is a greater distance from the user's eyes than 3D electronic screen 704. As virtual object 700B is rendered on 3D electronic display 704 to appear closer to the user, each eye 702 again rotates inward to stay verged on virtual object 700B, but the power or focal length of each eye is not reduced; hence, the user's eyes do not accommodate as in FIG. 7A. Thus, instead of reducing power or focal length to accommodate for the closer vergence depth, eye 702 maintains accommodation at a distance associated with 3D electronic display 704. Thus, the vergence depth ($d_v$) often does not equal the focal length ($d_f$) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable desirable for virtual reality system creators. Changes in vergence for a 3D electronic screen may be accommodated by a VR headset dynamically adjusting the power of an optics block based on the vergence depth (or predicted vergence depth).

Figure 8A:
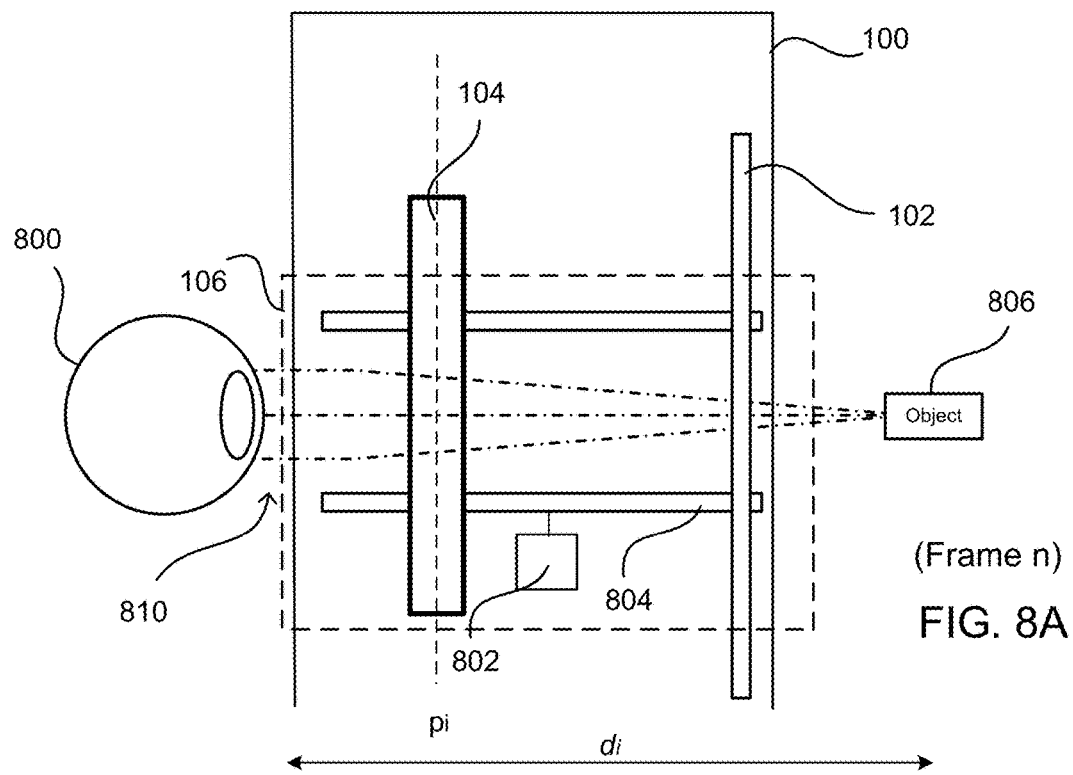
FIGS. 8A and 8B show an example process for adjusting the focal length of an optics block of a virtual reality headset by varying the distance between a display screen and the optics block using a varifocal element, in accordance with at least one embodiment.
Figure 8B:
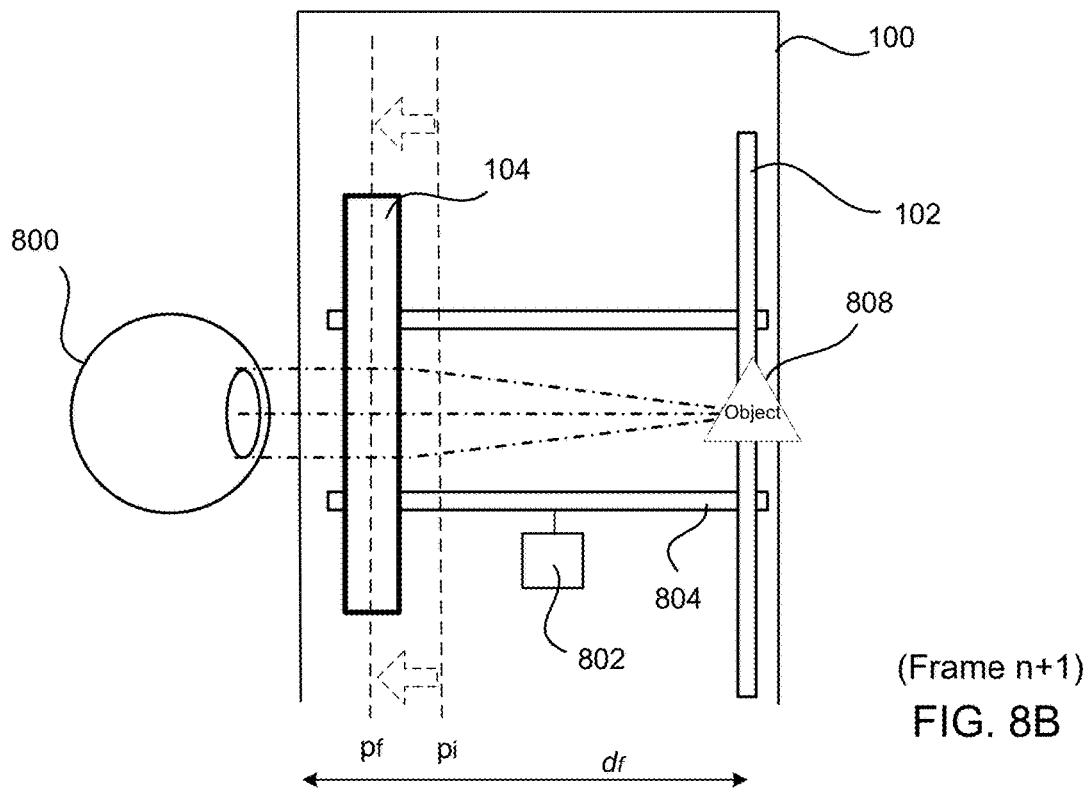

Accordingly, referring again to FIG. 4, the focal length (or power) of optics block 104 is adjusted 418 for the presented frame of the virtual scene to provide accommodation for the generated filtered vergence depth. FIGS. 8A and 8B show an example process for adjusting the focal length of optics block 104 by varying the distance between electronic display 102 and optics block 104 using varifocal element 802. In the example of FIGS. 8A and 8B, varifocal actuation block 106 includes varifocal element 802, such as an actuator or motor and track 804, but may also include other components enabling optics block 104, electronic display 102, or both to move along track 804 to dynamically adjust the optical power of optics block 104.

FIG. 8A shows an example of VR headset 100 providing s focus adjustment for frame n of a virtual scene. In this example, virtual scene includes object 806 displayed on electronic display 102 at which the gaze of user 800 is directed (i.e., verged). A virtual image of object 806 is located a virtual distance $d_i$, behind electronic display 102, from exit pupil 810. In the example of FIG. 8A, optics block 104 is in position $p_i$, which provides accommodation for distance $d_i$ to enable comfortable viewing of object 806.

FIG. 8B shows VR headset 100 providing s focus adjustment for a subsequent frame n+1 of the virtual scene. In this example, user 800 may have repositioned its eyes to look at object 808 or object 808 quickly moved toward user 800 in the virtual scene. As a result, the virtual image of object 808 is located close to electronic display 102. In response to the location of object 808 close to the electronic display 102, which is closer than object 806 in FIG. 8A), eyes of user 800 rotate inward to verge on object 808, causing vergence processing module 112 to determine a new vergence depth for frame n+1 and to provide the new vergence depth to varifocal actuation block 106. Based on the new vergence depth, varifocal element 802 moves optics block 104 from position $p_i$ to new position $p_f$ to accommodate user 800 at the new vergence depth $d_f$ for the closer object 808.

In one example, each state of optics block 104 corresponds to a combination of focal length and eye position, provides accommodation for a range of vergence depths, and is associated with a specific position of optics block 104. Accordingly, vergence depths may be mapped to positions of optics block 104 and stored in a lookup table. Thus, when a vergence depth is received from vergence processing module 112, varifocal actuation block 106 automatically moves optics block 104 to a position corresponding to the received vergence depth based on the lookup table.

In many instances, virtual reality systems aim to present users with a virtual environment that closely simulates a real world environment or provides users with content causing the users to get lost in the illusion created by the virtual reality systems. To provide users with a realistic or captivating virtual environment, a virtual reality system implements multiple systems and methods discussed herein to operate together at efficiencies that are imperceptible to a user. For example, transition delays are particularly costly to user experience with virtual reality systems. If a user is waiting for the virtual scene presented by a VR headset to catch up to what the user's brain is already expecting, the illusion is broken and/or the user may get nauseous. However, processing speeds and commercially available actuators are currently faster than the coordination of the human eye to change the shape of its lens and the human brain to register what the new shape of the lens is focused on, allowing the disclosed systems and methods to provide users with high-quality virtual environments.

Referring back to FIGS. 8A and 8B to provide accommodation for a new vergence depth while also leaving time to perform additional calculations without users perceiving a delay, a speed at which varifocal element 802 moves optics block 104 is limited by a rate at which the human eye performs accommodation. For example, assuming human eye accommodation has a 10 diopter/sec peak velocity, a 100 diopter/sec$^2$ peak acceleration, and changing the distance between electronic display 102 and optics block 104 moves a virtual image about 0.5 diopters mm, varifocal element 802 operates with a minimum velocity of 10/0.5=20 mm/sec and a minimum acceleration of 100/0.5=200 mm/sec$^c$ acceleration to prevent a user from perceiving the repositioning of optics block 104 relative to electronic display 102. There are commercially available actuators satisfying the preceding values.

Figure 9A:
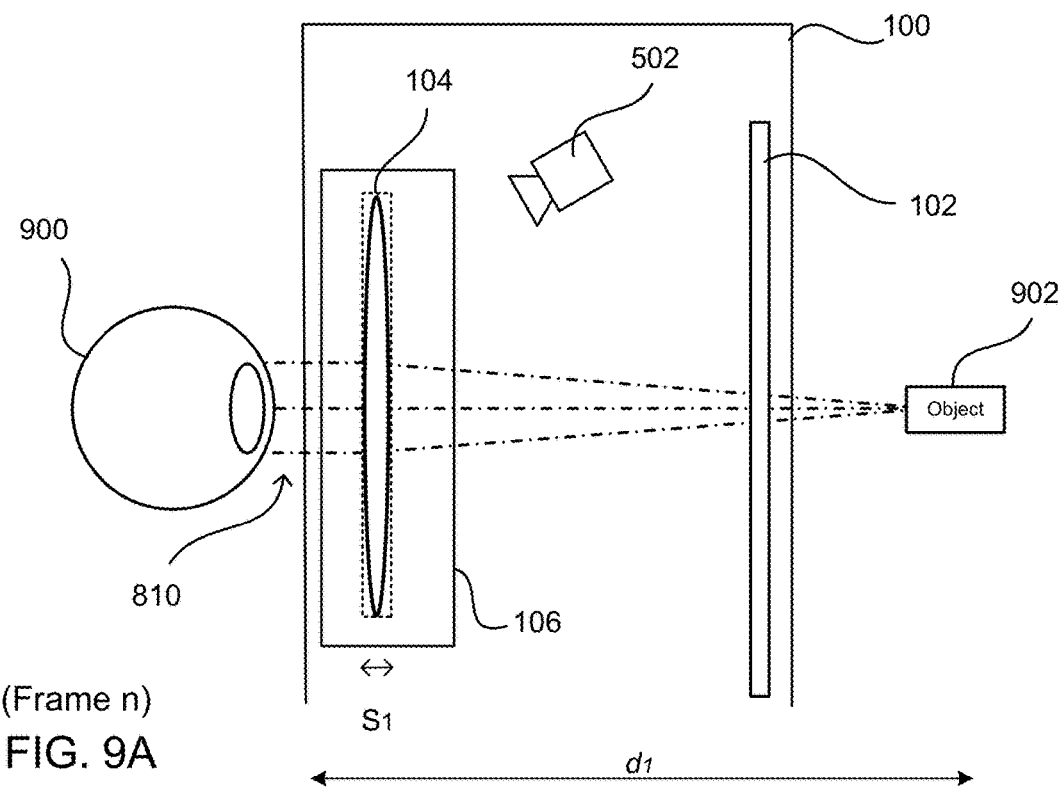
FIGS. 9A and 9B show an example process for adjusting the focal length by changing the shape or optical path length of the optics block of a virtual reality headset using a varifocal element, in accordance with at least one embodiment.
Figure 9B:
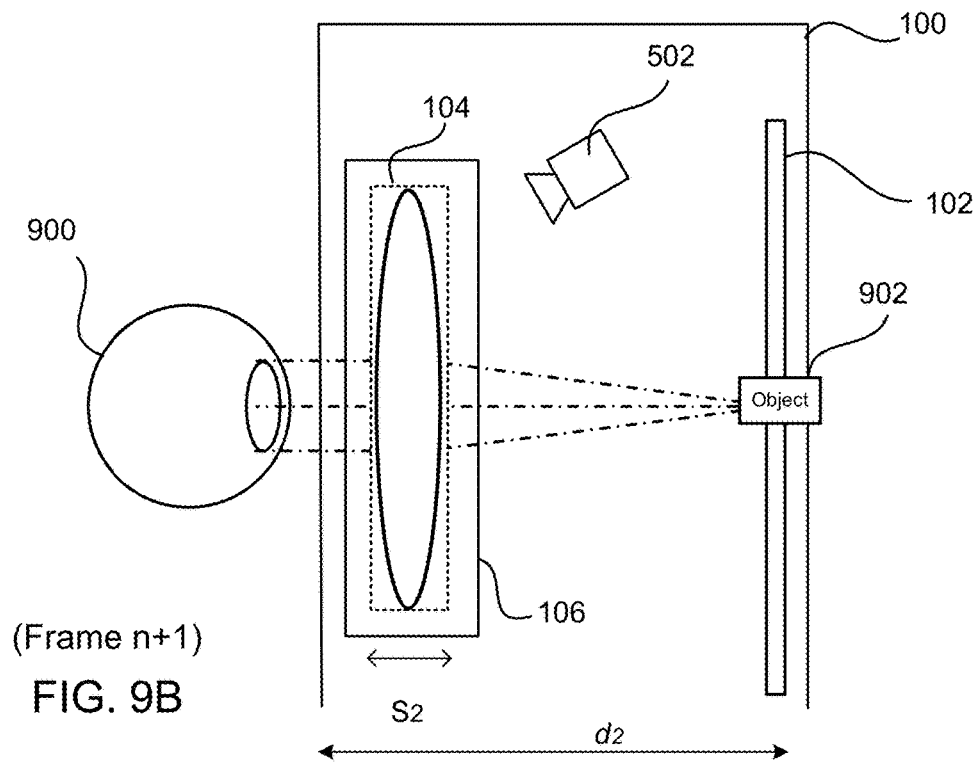

FIGS. 9A and 9B show an alternative example process for adjusting the focal length of optics block 104 with a varifocal element by changing the shape of one or more lenses in optics block 104. Similarly to the example of FIGS. 8A and 8B, FIG. 9A shows an example of VR headset 100 providing focus for a frame n of a virtual scene that includes object 902 displayed on electronic display 102 at which the gaze of user 900 is directed (e.g., verged). A virtual image of object 902 is similarly located a virtual distance $d_1$, which is behind electronic display 102, from exit pupil 810. In the example of FIG. 9A, varifocal actuation block 106 changes the shape of one or more lenses of optics block 104 to provide accommodation for distance $d_i$ with lens shape $S_1$ to enable comfortable viewing of object 902.

FIG. 9B shows VR headset 100 providing focus for a subsequent frame n+1 of the virtual scene, by changing the shape of one or more lenses of optics block 104. In this example, object 902 has moved toward user 900 from distance $d_1$ to $d_2$ in the virtual scene, causing a change in vergence and necessitating a complementary adjustment in accommodation. Accordingly, vergence processing module 106 determines a new vergence depth for frame n+1 and provides the new vergence depth to varifocal actuation block 106, which changes the shape of one or more lenses of optics block 104 from shape $S_1$ to new lens shape $S_2$ to accommodate user 900 at the new closer vergence depth $d_2$.

As described above, different states of optics block 104 correspond to various focal lengths, provide accommodation for a range of vergence depths, and are associated with a lens shape or other adjustable property affecting focal length.

Accordingly, vergence depths can be mapped to lens shapes or properties and stored in a lookup table. Thus, when a vergence depth is received from vergence processing module 112, varifocal actuation block 106 identifies a lens shape corresponding to the vergence depth from the lookup table and changes the shape of one or more lenses in optics block 104 to the identified lens shape corresponding to the new vergence depth. As described above in conjunction with FIG. 1, varifocal actuation block 106 may include one or more components to change the shape or other property affecting the focal length of one or more lenses of optics block 104. Example components for changing the shape of one or more lenses or other property affecting the focal length include: shape-changing polymer lenses, liquid lenses with electrowetting, Alvarez-Lohmann lenses, deformable membrane mirrors, liquid crystal (electroactive) lenses, phase-only spatial light modulator (SLM), and other suitable components.

Returning to FIG. 4, depth of field blur is determined 420 for the virtual scene. To determine 420 depth of field blur, a point within the scene presented to the user by the VR headset 100 where the user's gaze is directed is determined, and optics block 104 is configured to a state in which the point within the scene where the user's gaze is directed is brought into focus for the user. Depth of field blur is then determined 420 relative to the point within the scene where the user's gaze is directed. In one example, the depth within the scene geometry (e.g., distances within the virtual scene) corresponding to the filtered vergence depth is determined as the plane of focus for the frame of the virtual scene. Accordingly, objects or features of the virtual environment with distances within the virtual scene greater or less than a distance of the plane of focus from the user's eyes may be rendered with synthetic blur. In another example, the depth of field blur is determined based on an object in the scene on which the user's gaze is focused at the depth corresponding to the filtered vergence depth (i.e., a "focal object"). Thus, the focal object, rather than the plane of focus, provides a reference point to identify other objects in the scene that are rendered with depth of field blur, even if the other objects have a similar depth in the scene as the focal object.

The blur may be progressive, with as a level of blur applied to objects or features based on a distance of the objects or features from the plane of focus (or object of focus), or a generally uniform level of blur may be applied to objects or features in the virtual scene. Depth of field blur is a natural consequence of binocular vision, so including depth of field blur in the virtual scene furthers to the illusion of the virtual scene by providing the user with an expected depth cue, which may enhance the user experience with the virtual scene. Further, the blur may be based at least in part on measured properties of the user's eye. For example, wavefront aberrations of the user's eye could be measured by a wavefront aberrometer, with depth of field blur based at least in part on the measured wavefront aberrations. Example wavefront aberrations of the user's eye may include higher-order aberrations not typically corrected by eye glasses, contact lenses, or refractive surgery. Accounting for properties of the user's eye when determining the depth of field blur may improve user comfort when viewing the scene.

The frame of the virtual scene corresponding to the portion of the virtual scene being viewed by the user is displayed 422 on electronic display 102 with a distortion correction to correct optical error caused by the determined state of optics block 104 and with depth of field blur based on the filtered vergence depth. Further, varifocal actuation block 106 has changed the focus of optics block 104 to provide focus and accommodation to the location in the portion of the virtual scene where the user's eyes are verged. In various embodiments, the process 400 may include additional steps or perform steps in different orders than the order described in conjunction with FIG. 4.

In various embodiments, operation of varifocal actuation block 106 is based at least in part on characteristics of a user's vision. For example, optics block 104, varifocal actuation block 106 and scene rendering module 120 compensate for one or more characteristics of the user's vision when a scene is presented to the user. Example characteristics of a user's vision that may be compensated or otherwise accounted for by varifocal actuation block 106 include refractive errors (e.g., eyeglass prescription) and accommodation range (e.g., presbyopia, myopia, hyperopia or astigmatism). For example, if a user has a refractive error of +1 D spherical power, then optics block 104 is configured to a state that corrects the user's refractive error and maintain focus, as well as maintains focus of objects within the scene at which the user is looking. Additionally, varifocal actuation block 106 and scene rendering module 120 may account for the user's specific accommodation range (near to far distances with correction) when determining 420 depth of field blur. For example, users with presbyopia have a reduced range of accommodation, so varifocal actuation block 106 may provide a limited number of states of optics block 104 that account for a limited number of focal lengths or otherwise account for a user's range of accommodation. Accommodation range and refractive errors may be specified by the user or may be obtained from information associated with the user, such as digital medical records of the user that the user has authorized one or more components of the VR system environment to access. Alternatively, lens assemblies or other components may be coupled to VR headset 100 to correct user's vision while using the VR headset 100 instead of eyeglasses. If lens assemblies are coupled to VR headset, 100, the lens assemblies may be separately calibrated to adjust the correlation between states of optics block 104 and various distortion corrections. Further, varifocal actuation block 106 may adjust the cylindrical power and axis of VR headset 100 to compensate for astigmatism as well as adjust a spherical power of VR headset 100. For example, varifocal actuation block 106 rotates rotating two cylindrical lenses relative to one another to adjust the cylindrical power of VR headset 100.

Display of a scene by VR headset 100 is modified to mitigate distortion introduced by optical errors of optics block 104 included in VR headset 100 that directs image light from electronic display element 102 presenting the scene to an eye of a user. A distortion correction is applied to the scene that pre-distorts the scene, and distortion caused by optics block 140 compensates for the pre-distortion as light from the modified scene passes through optics block 104. Hence, the scene viewed by the user is not distorted. Accordingly, distortion corrections account for different levels and types of distortion caused by different eye positions relative to optics block 104 or different focal lengths of optics block 140. Accordingly, the distortion corresponding to different potential eye positions relative to optics block 104 and at potential focal lengths of optics block 104 is determined by measuring a wavefront (i.e., propagation of points of the same phase) of light from the electronic display element after the light has passed through the optics block Different eye positions relative to optics block 104 and different states of optics block 104 cause different degrees of optical error in light directed through optics block 104. This optical error distorts light from electronic display element 102 included in VR headset 100, which may impair presentation of a virtual scene to a user. Accordingly, distortion correction maps are generated based on measurements of the wavefront for different states of optics block 104 to correct for optical error introduced by different states of optics block 104, which accounts for different focal lengths caused by optics block 104.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A method comprising:
   determining, using at least one image capturing element inside a head-mounted display (HMD), an eye position for each eye of a user, the HMD including an optics block configured to focus light from a display presenting a virtual scene to the user and a varifocal element configured to change a focal length of the optics block based on a viewing location within the virtual scene of the user;
   determining gaze lines for each eye of the user based at least in part on each eye position, the determined gaze lines identifying the viewing location within the virtual scene;
   estimating a vergence depth for the viewing location of the user based on an estimated intersection of the gaze lines;
   comparing the estimated vergence depth to a depth associated with the viewing location identified by scene geometry data of the virtual scene;
   replacing the estimated vergence depth with the depth of the viewing location based on a difference between the estimated vergence depth and the depth of the viewing location being greater than a threshold;
   adjusting the focal length of the optics block based on the depth of the viewing location identified by the scene geometry data to provide accommodation for the user using the varifocal element; and
   displaying the virtual scene on the display of the HMD.

2. The method of claim 1, wherein displaying the virtual scene on the display of the HMD comprises:
   determining, for a frame of the virtual scene, a state of the optics block based on a state of the optics block during presentation of one or more previously presented frames of the virtual scene, each state of the optics block associated with a distortion correction map that corrects for optical error introduced by the state of the optics block;
   determining a distortion correction map associated with the determined state of the optics block for the frame of the virtual scene to correct optical error introduced by the determined state of the optics block for the frame;
   applying the determined distortion correction map to the frame of the virtual scene; and
   displaying the virtual scene after application of the determined distortion correction map on the display of the HMD.

3. The method of claim 2, further comprising:
   determining, for the determined eye position of each eye, at least one of a distance between each eye and the optics block or a position of each eye relative to the optics block, each state of the optics block is associated with a focal length of the optics block and at least one of the distance between each eye and the optics block or the position of each eye relative to the optics block, each distortion correction map further correcting for optical error introduced by at least one of the distance between each eye and the optics block or the position of each eye relative to the optics block.

4. The method of claim 1, wherein displaying the identified objects in the virtual scene with synthetic blur comprises:
   identifying objects in the virtual scene with distances from an eye of the user that are different than a distance of the depth of the viewing location identified by the scene geometry data from the eye of the user;
   displaying the identified objects in the virtual scene with synthetic blur
   determining a level of synthetic blur for an identified object based at least in part on a distance between the identified object and the depth of the viewing location identified by the scene geometry data; and
   displaying the identified object in the virtual scene with the determined level of synthetic blur.

5. The method of claim 1, wherein adjusting the focal length of the optics block based on the depth of the viewing location identified by the scene geometry data to provide accommodation for the user using the varifocal element comprises:
   changing a distance between the optics block and the display by moving the optics block.

6. The method of claim 1, wherein adjusting the focal length of the optics block based on the depth of the viewing location identified by the scene geometry data to provide accommodation for the user using the varifocal element comprises:
   changing a shape or optical path length of a lens of the optics block.

7. The method of claim 6, wherein changing the shape or the optical path length of the lens of the optics block includes using at least one selected from a group consisting of a shape-changing polymer lens, a liquid lens and electrowetting, an Alvarez-Lohmann lens, a deformable membrane mirror, a liquid crystal (electroactive) lens, a phase-only spatial light modulator (SLM), and any combination thereof.

8. The method of claim 1, wherein determining, using at least one image capturing element inside the HMD, an eye position for each eye of the user comprises:
   determining a position and an orientation of the HMD using one or more position sensors; and
   determining the viewing location of the user based at least in part on the position and the orientation of the HMD.

9. A method comprising:
   determining, using at least one image capturing element inside a head-mounted display (HMD), an eye position for each eye of a user, the HMD including an optics block configured to focus light from a display presenting a virtual scene to an exit pupil and a varifocal element configured to change a focal length of the optics block based on a viewing location within the virtual scene of the user;

determining a three-dimensional (3D) gaze point of the user based at least in part on the eye position determined for each eye, the determined three-dimensional gaze point identifying the viewing location within the virtual scene;

estimating a vergence depth for the viewing location of the user based on 3D gaze point, the estimated vergence depth corresponding to an object of focus for the user;

comparing the estimated vergence depth to a depth associated with the viewing location identified by scene geometry data for the object within the virtual scene;

replacing the estimated vergence depth with the depth associated with the viewing location based on a difference between the estimated vergence depth and the depth of the viewing location being greater than a threshold;

adjusting the focal length of the optics block for the virtual scene based on the depth of the viewing location identified by the scene geometry data using the varifocal element to provide accommodation for the object of focus; and displaying, the virtual scene on the display of the HMD.

10. The method of claim 9, wherein adjusting the focal length of the optics block for the virtual scene based on the depth associated with the viewing location identified by the scene geometry data using the varifocal element comprises:
changing a distance between the optics block and the display by moving the optics block.

11. The method of claim 9, wherein adjusting the focal length of the optics block for the virtual scene based on the depth associated with the viewing location identified by the scene geometry data using the varifocal element comprises:
changing a shape or optical path length of a lens included in the optics block.

12. The method of claim 11, wherein changing the shape or optical path length of the lens included in the optics block comprises using at least one selected from a group consisting of a shape-changing polymer lens, a liquid lens and electrowetting, an Alvarez-Lohmann lens, a deformable membrane mirror, a liquid crystal (electroactive) lens, a phase-only spatial light modulator (SLM), and any combination thereof.

13. The method of claim 9, wherein displaying the virtual scene on the display of the HMD comprises:
identifying objects in the virtual scene with distances from an eye of the user other than a distance of the depth associated with the viewing location identified by the scene geometry data from the eye of the user; and
displaying the identified objects in the virtual scene with synthetic blur.

14. A non-transitory computer-readable storage medium storing instructions that, when executed by at least one processor, cause the processor to:
capture, using a camera of ahead-mounted display (HMD), image information corresponding to an eye position for each eye of a user, the HMD including an optics block configured to focus light from a display presenting a virtual scene to an exit pupil and a varifocal element configured to change a focal length of the optics block based on a viewing location of the user within the virtual scene;
determine gaze lines of the user based at least in part on each eye position, the determined gaze lines identifying the viewing location within the virtual scene;
estimate a vergence depth for the viewing location of the user based on an estimated intersection of the gaze lines;
compare the estimated vergence depth to a depth associated with the viewing location identified by the scene geometry data;
replace the estimated vergence depth with the depth associated with the viewing location based on a difference between the estimated vergence depth and the depth of the viewing location being greater than a threshold;
adjust the focal length of the optics block for a frame of the virtual scene using the varifocal element based on the depth associated with the viewing location identified by the scene geometry data to provide accommodation for the plane of focus; and
display the virtual scene on the display of the HMD.

15. The non-transitory computer-readable storage medium of claim 14, wherein displaying the virtual scene on the display of the HMD comprises:
determine, for a frame of the virtual scene, a state of the optics block based on a state of the optics during presentation of one or more previously presented frames of the virtual scene, each state of the optics block associated with a distortion correction map that corrects for optical error introduced by the state of the optics block;
determine a distortion correction map associated with the determined state of the optics block for the frame of the virtual scene to correct optical error introduced by the determined state of the optics block for the frame;
apply the determined distortion correction map to the frame of the virtual scene; and
display the virtual scene after application of the determined distortion correction map on the display of the HMD.

16. The non-transitory computer-readable storage medium of claim 14, wherein displaying the virtual scene on the display of the HMD comprises:
identify objects in the virtual scene with distances from an eye of the user other than a distance of the depth associated with the viewing location identified by the scene geometry data from the eye of the user; and
display the identified objects in the virtual scene with synthetic blur.

17. The non-transitory computer-readable storage medium of claim 14, wherein adjusting the focal length of the optics block based on the depth associated with the viewing location identified by the scene geometry data to provide accommodation for the user using the varifocal element comprises:
change a distance between the optics block and the display by moving the optics block.

18. The non-transitory computer-readable storage medium of claim 14, wherein adjusting the focal length of the optics block based on the depth associated with the viewing location identified by the scene geometry data to provide accommodation for the user using the varifocal element comprises:
change a shape or optical path length of a lens of the optics block.

19. The non-transitory computer-readable storage medium of claim 18, wherein change the shape or optical path length of the lens of the optics block includes using at least one selected from a group consisting of a shape-changing polymer lens, a liquid lens and electrowetting, an Alvarez-Lohmann lens, a deformable membrane mirror, a liquid crystal (electroactive) lens, a phase-only spatial light modulator (SLM), and any combination thereof.

\* \* \* \* \*